UNITED STATES PATENT OFFICE.

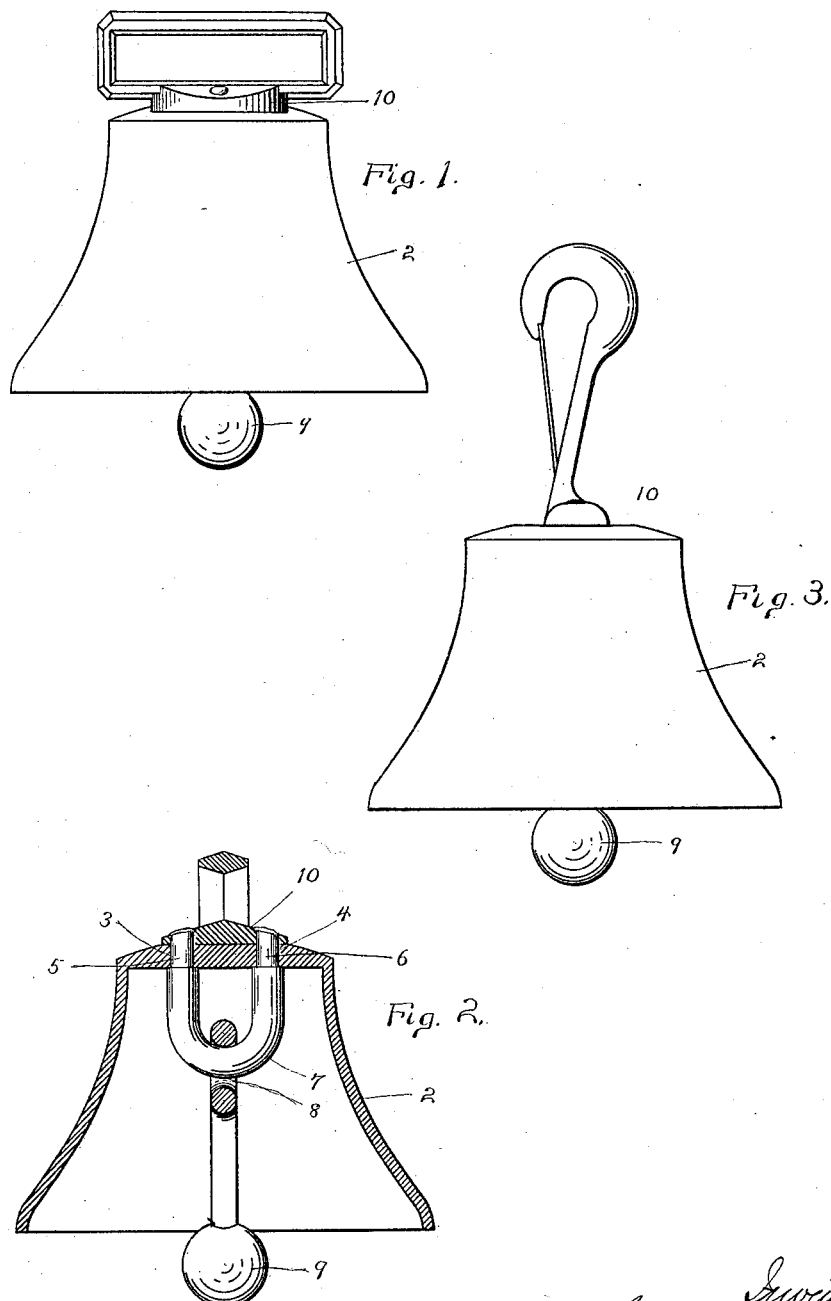

GEORGE W. GOFF, OF EAST HAMPTON, CONNECTICUT.

BELL.

1,029,286.  Specification of Letters Patent.  Patented June 11, 1912.

Application filed April 15, 1911. Serial No. 621,355.

*To all whom it may concern:*

Be it known that I, GEORGE W. GOFF, a citizen of the United States, residing at East Hampton, in the county of Middlesex and State of Connecticut, have invented a new and useful Improvement in Bells; and I do hereby declare the following, when taken in connection with the accompanying drawings and the letters of reference marked thereon, to be a full, clear, and exact description of the same, and which said drawings constitute part of this specification, and represent, in—

Figure 1 a side view of a bell constructed in accordance with my invention. Fig. 2 a vertical sectional view of the same. Fig. 3 a side view of the bell showing a snap hook connected thereto.

This invention relates to an improvement in bells, and particularly to bells of the so called Swiss cow-bell type, the object being to provide means for hanging the tongue and securing the means for suspending the bell in place; and the invention consists in the construction hereinafter described and particularly recited in the claim.

In carrying out my invention, I employ a bell 2 usually cast and having a flaring mouth. In the top of this bell are two perforations 3, 4, to receive the reduced straight ends 5, 6, of a U-shaped staple 7 which are passed through the eye 8 of the bell tongue 9, the shoulders formed by reducing the ends having a bearing against the inner face of the top of the bell. The upper ends 5, 6 of the staple are long enough to extend up through the base 10 of a suspension device which is formed with perforations to aline with the perforations in the top of the bell. This suspension device may be a wide loop as shown in Figs. 1 and 2 of the drawings through which the strap may be passed, or it may be a snap hook as shown in Fig. 3 of the drawings. The ends of the staple are upset upon the upper surface of the base so as to securely fasten the tongue in the bell and secure the suspension device to the top of the bell. It will be seen that this method of securing the tongue and suspension device is exceedingly simple and forms a very strong connection for the parts.

I claim:—

The combination with a bell, of a suspension device therefor, said suspension device formed with an integral base, the upper end of the bell and the base of the suspension device having alined openings, combined with a U-shaped staple having reduced ends which extend up through the said perforations in the bell and suspension device, a bell tongue hung upon said staple and the ends of the staple upset upon the base of the suspension device, whereby the tongue is secured in the bell and the suspension device riveted to the outer face thereof.

In testimony whereof, I have signed this specification in the presence of two subscribing witnesses.

GEORGE W. GOFF.

Witnesses:
CHARLES E. TORKELSON,
FRED H. BARTON.

---

Copies of this patent may be obtained for five cents each, by addressing the "Commissioner of Patents, Washington, D. C."